(12) United States Patent
Takeuchi et al.

(10) Patent No.: US 7,816,300 B2
(45) Date of Patent: Oct. 19, 2010

(54) CATALYST FOR PURIFYING EXHAUST GAS

(75) Inventors: Michihiko Takeuchi, Kakegawa (JP); Hirotaka Ori, Kakegawa (JP); Takeru Yoshida, Nishikamo-gun (JP); Kazunobu Ishibashi, Toyota (JP); Ichiro Hachisuka, Nagoya (JP)

(73) Assignees: Cataler Corporation, Shinzuoka (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 12/227,523

(22) PCT Filed: Jun. 5, 2007

(86) PCT No.: PCT/JP2007/061684

§ 371 (c)(1),
(2), (4) Date: Nov. 20, 2008

(87) PCT Pub. No.: WO2007/145152

PCT Pub. Date: Dec. 21, 2007

(65) Prior Publication Data

US 2009/0137387 A1    May 28, 2009

(30) Foreign Application Priority Data

Jun. 14, 2006    (JP)    ............................. 2006-164900

(51) Int. Cl.
*B01J 23/40* (2006.01)
*B01J 23/10* (2006.01)
*B01D 53/94* (2006.01)

(52) U.S. Cl. ................. 502/325; 423/213.5; 423/244.1; 502/304; 502/326; 502/339; 502/344; 502/527.12

(58) Field of Classification Search ................. 502/304, 502/527.12, 521.13, 325, 326, 339, 344; 423/213.5, 244.1
See application file for complete search history.

(56) References Cited

U.S. PATENT DOCUMENTS 5,001,103 A    3/1991    Koberstein et al.

(Continued)

FOREIGN PATENT DOCUMENTS

JP    A-04-027430    1/1992

(Continued)

OTHER PUBLICATIONS

Golunski et al., "Identifying The Functions Of Nickel In The Attenuation of $H_2S$ Emissions From Three-way Automotive Catalysts," *Catalysis Today*, 1991 vol. 9, pp. 105-112.

(Continued)

*Primary Examiner*—Wayne Langel
*Assistant Examiner*—Syed Iqbal
(74) *Attorney, Agent, or Firm*—Oliff & Berridge, PLC

(57) ABSTRACT

The present invention provides an exhaust gas purification catalyst comprising a base material, and a two or more layered catalyst coating layer, formed on the base material, wherein the two or more layers have upper and lower layers, and wherein the upper layer contains a large amount of noble metal per liter of the base material more than that of the lower layer, and the lower layer contains a large amount of an oxygen storage/release material per liter of the base material more than that of the upper layer. This exhaust gas purification catalyst has more excellent $H_2S$ purifying performance than conventional catalysts while maintaining purifying performance against NOx and the other exhaust gas components.

7 Claims, 2 Drawing Sheets

[ADSORPTION]

FUEL LEAN TO STOICHIOMETRIC ENVIRONMENT AT LOW TEMPERATURE

[DESORPTION]

FUEL-RICH ENVIRONMENT AT HIGH TEMPERATURE

U.S. PATENT DOCUMENTS

| | | | |
|---|---|---|---|
| 5,013,705 A | 5/1991 | Koberstein et al. | |
| 5,254,519 A | 10/1993 | Wan et al. | |
| 5,597,771 A * | 1/1997 | Hu et al. | 502/304 |
| 5,702,675 A | 12/1997 | Takeshima et al. | |
| 6,090,744 A * | 7/2000 | Koda et al. | 502/304 |
| 6,348,430 B1 * | 2/2002 | Lindner et al. | 502/304 |
| 2004/0038812 A1 * | 2/2004 | Hachisuka | 502/243 |
| 2004/0151645 A1 * | 8/2004 | Li | 423/213.5 |
| 2006/0217263 A1 * | 9/2006 | Kawamoto et al. | 502/304 |

FOREIGN PATENT DOCUMENTS

| | | |
|---|---|---|
| JP | A-04-219140 | 8/1992 |
| JP | A-08-168675 | 7/1996 |
| JP | A-09-500570 | 1/1997 |
| JP | A-11-169712 | 6/1999 |
| JP | A-2001-104785 | 4/2001 |
| JP | A-2004-283695 | 10/2004 |
| JP | A-2004-322022 | 11/2004 |
| JP | A-2005-169203 | 6/2005 |
| JP | A-2006-516524 | 7/2006 |

OTHER PUBLICATIONS

Supplementary European Search Report in European Application No. 07 74 4976 mailed Apr. 30, 2010.

* cited by examiner

CATALYST FOR PURIFYING EXHAUST GAS

TECHNICAL FIELD

The present invention relates to a two-layered exhaust gas purification catalyst which achieves reduced emission of hydrogen sulfide by disposing a noble metal as a catalyst component, in particular, platinum and an oxygen storage/release material as a carrier, which are contained in the two-layered coating layer, so that they can be segregated as much as possible.

BACKGROUND ART

An automobile fuel including gasoline and the like contains a sulfur component, S, wherein the sulfur component forms sulfur dioxide, $SO_2$ during combustion. For instance, when a catalyst for purifying exhaust gas is under reducing atmosphere, this sulfur dioxide may react with hydrogen, $H_2$ to produce hydrogen sulfide, $H_2S$ by a catalytic reaction. Since the resulted hydrogen sulfide can be responsible for strange odors, it is required to suppress production of hydrogen sulfide.

As currently-proposed solutions for suppressing the production of hydrogen sulfide, nickel has been generally added to exhaust gas purification catalysts (Catalysis Today, 9, (1991) 105-112). Japanese Unexamined Patent Publication (Kokai) No. 4-219140 discloses an exhaust gas purification catalyst with a two-layered coating layer, wherein oxidized nickel is added into the layer in order to reduce hydrogen sulfide.

In recent years, however, nickel and nickel compounds are designated by Europe and several other countries as environmental load substances, and thus cannot be used for the catalysts.

DISCLOSURE OF THE INVENTION

Accordingly, it is an object of the present invention to provide an exhaust gas purification catalyst without nickel which can reduce the emission of hydrogen sulfide while maintaining the exhaust gas purification performance.

In the mechanism of the exhaust gas purification catalysts for producing hydrogen sulfide under reducing atmosphere, platinum (catalyst component) and ceria (oxygen storage/release material) in the catalysts may produce $H_2S$ from $SO_2$ as shown in FIG. 1. After careful consideration of the mechanism, the present inventors have found that reduced emission of hydrogen sulfide while maintaining the purification performance can be achieved in the absence of nickel by disposing a noble metal as a catalyst component which contributes to an absorption-desorption reaction of sulfur components, and an oxygen storage/release material as a carrier, both of which are contained in the layer, on the carrier so that they can be segregated as much as possible. In addition, the present inventors clarified that a further improved reduction of emission of hydrogen sulfide can be obtained by decreasing a specific surface area of the oxygen storage/release material in the catalyst so as to inhibit the adsorption of sulfur components on the oxygen storage/release material.

According to the present invention, an exhaust gas purification catalyst comprising a base material, and a two or more layered catalyst coating layer, formed on the base material is provided, wherein the two or more layers have upper and lower layers which do not contain nickel, and wherein the upper layer contains a large amount of noble metal per liter of the base material more than that of the lower layer, and the lower layer contains a large amount of an oxygen storage/release material per liter of the base material more than that of the upper layer.

According to the exhaust gas purification catalyst of the present invention, the reduced emission of hydrogen sulfide while maintaining the same level of the exhaust gas purification performance as those of conventional catalysts can be accomplished by disposing the noble metal and oxygen storage/release material, which act as a trigger for the absorption-desorption reaction of sulfur components in the catalyst so that the noble metal and oxygen storage/release material can be segregated as much as possible. Among the noble metals, in particular, platinum has a profound reduced effect of emission of hydrogen sulfide due to the segregation from the oxygen storage/release material. In addition to the aspect of segregating the noble metal, the oxygen storage/release material which can adsorb not only oxygen but also sulfur also may contribute to the reduced emission of hydrogen sulfide because disposing a large amount of the oxygen storage/release material on the lower layer rather than the upper layer may result in reducing the amount of sulfur to be adsorbed on the whole catalyst layer. For this reason, it is believed that the emission of hydrogen sulfide can be reduced even in a fuel-rich environment at high-temperature.

The said reduced emission of hydrogen sulfide can be further improved by decreasing a specific surface area of the oxygen storage/release material such that the adsorption of sulfur components on the oxygen storage/release material is inhibited. The present invention is desired in avoiding use of nickel being an environmental load substance while maintaining the exhaust gas purification performance as compared with conventional exhaust gas purification catalysts.

BEST MODE FOR CARRYING OUT THE INVENTION

Figure 1:
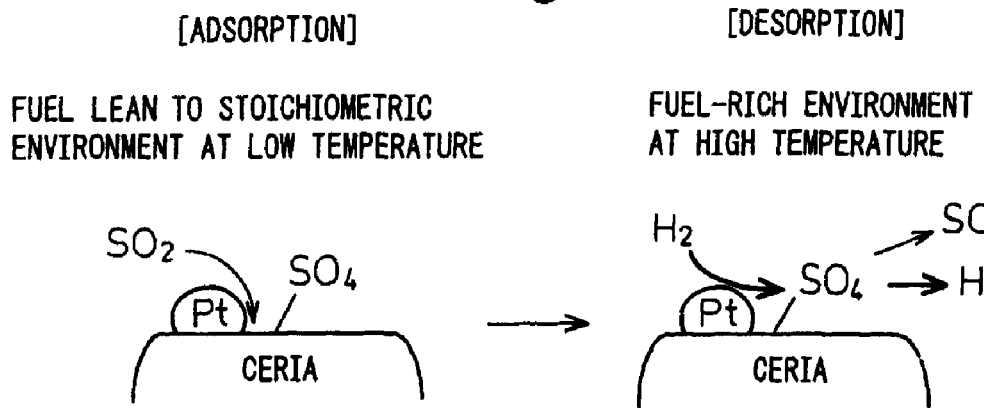
FIG. 1 is a schematic view of a mechanism wherein $H_2S$ is produced by ceria and platinum.

The term "base material" as used in the exhaust gas purification catalyst of the present invention refers to a material for carrying thereon a slurry coating solution which comprises catalyst components and oxygen storage/release materials, and wherein it is intended as the one commonly used for production of the exhaust gas purification catalysts. The base material is preferably a porous base material formed by cordierite and the other material, like honeycomb, from the viewpoint of supporting the catalyst components thereon to be dispersed.

In the present invention, a catalyst coating layer is formed on the base material, wherein the layer contains catalyst components and oxygen storage/release materials. In order to dispose noble metals and oxygen storage/release materials so that they can be segregated as much as possible, the catalyst coating layer of the present invention has a two or more layered structure comprising upper and lower layers. In a preferred embodiment, the catalyst coating layer does not contain nickel.

The above mentioned catalyst coating layer contains one or more noble metals as the catalyst components in the upper and lower layers. The noble metals are disposed more in the upper layer than the lower layer so that they can be segregated from the oxygen storage/release materials as much as possible, wherein the oxygen storage/release materials are disposed more in the lower layer. Preferred noble metals are platinum and/or rhodium for the upper layer and palladium and/or rhodium and/or platinum for the lower layer. Among the noble metals, however, platinum allows for more efficient reduction of the emission of hydrogen sulfide due to the segregation from the oxygen storage/release materials. Therefore, the noble metal to be contained in the lower layer is more preferably palladium or rhodium. In this regard, however, if the amount of platinum to be contained in the lower layer is extremely small, the suppressed production of $H_2S$ according to the present invention can be attained in the presence of palladium as well as palladium or rhodium. In fact, reducing the amount of platinum to be contained in the lower layer to 0.3 g or less per liter of the base material can suppress the production of $H_2S$ as compared with conventional exhaust gas purification catalysts. In addition, the catalyst components in the upper and lower layers are not limited to the above-mentioned noble metals, and these layers may contain any other noble metals and the like except for nickel.

As the catalyst components to be contained in the upper catalyst coating layer, each amount of the noble metals (per liter of the base material) is not limited unless their total amount is higher than the one to be contained in the lower layer. As an example, when palladium, rhodium and/or platinum are used as the catalyst components in the lower layer, the palladium is preferably present therein in an amount of 0.1 to 5 g, more preferably 0.5 to 1.5 g per liter of the base material, the rhodium is preferably present therein in an amount of 0.1 to 1.0 g, more preferably 0.2 to 0.5 g per liter of the base material, and the platinum is preferably present therein in an amount of 0.3 g or less, more preferably 0.1 g or less per liter of the base material. On the other hand, the amount of the noble metals to be contained in the upper layer is regulated accordingly so that it does not fall below the amount in the lower layer. In addition, it should not be understood that the amount of the noble metals in the lower layer is limited to the above-mentioned ones. Furthermore, catalyst activities depend upon noble metal species to be used. Accordingly, in response to noble metals to be used, disposition of the catalyst components may have to be studied such that the catalyst activity in the upper layer is more than the lower layer, considering not only total amount of the noble metals but also whole catalyst activities in each layer.

The oxygen storage/release material to be contained in the catalyst coating layer as used herein refers to a material having a capacity to store oxygen in oxidizing atmosphere or release oxygen under reducing atmosphere (oxygen storage/release capacity (OSC)), which acts as a carrier for carrying thereon the catalyst components. However, in the present invention, the carrier to be used for carrying thereon the catalyst components is not limited to the oxygen storage/release material. For example, it may be used together with alumina, zirconia, and these composite oxides, and the like.

An example of the oxygen storage/release material includes ceria (also referred to as "cerium oxide" herein), rare-earth metal oxides including $Pr_6O_{11}$ and the like, transition metal oxides including $Fe_2O_3$, $CuO$, $Mn_2O_5$ and the like, and Ce—Zr composite oxides. From the viewpoint of the oxygen storage/release capacity, the oxygen storage/release material in the present invention is preferably ceria or Ce—Zr composite oxides.

The oxygen storage/release materials can suppress the adsorption of sulfur components thereon by reducing its specific surface area, and consequently the reaction for conversion into hydrogen sulfide can be inhibited under a reducing atmosphere. The specific surface area can be reduced, for example by firing a oxygen storage/release material having a given specific surface area at elevated temperature. According to the present invention, it is preferred to use a oxygen storage/release material having a specific surface area of 30 $m^2/g$ or less. More preferably, the specific surface area is 10 $m^2/g$ or less. The term "specific surface area" as used herein refers to a BET specific surface area per gram of the catalyst, measured by a surface area measuring instrument (MicroData 4232 from Kawachu Co. Ltd).

The oxygen storage/release material is disposed more in the lower layer than the upper layer in order to segregate it from the noble metals to be mainly contained in the upper catalyst coating layer as much as possible. For example, when ceria is used as the oxygen storage/release material, and its amount in the lower layer is 0.1 to 0.6 mole, the amount of ceria in the upper layer can be controlled to 0.08 mole or less per liter of the base material. However, from the viewpoint of reducing the emission of hydrogen sulfide much more, the upper catalyst coating layer preferably does not contain the oxygen storage/release material.

In addition, the catalyst coating layer includes, but not limited to the above catalyst components and the oxygen storage/release material, any possible substances to be carried on the base material for constituting the catalysts. For example, the catalyst coating layer may contain oxide of neodymium, iron, praseodymium, strontium, barium and the like, which are effective for suppression of the emission of hydrogen sulfide. These substances have an ability to adsorb sulfur, and thus can decrease the production of hydrogen sulfide. The $H_2S$ purification performance according to the present invention can be more improved by containing these substances in the catalyst coating layer. Among these oxides, neodymium oxide is in particular preferred because it is superior in reducing the $H_2S$ emission (result not shown). In addition, these substances for reducing the $H_2S$ emission are combined with the catalyst components and the like in a slurry coating solution, and then coated on the base material. Preferred amount of the substances for reducing the $H_2S$ emission is 0.05 to 0.2mole per liter of the base material, but is not limited thereto. The substances for reducing the $H_2S$ emission may be disposed in the upper or lower catalyst coating layer or both.

The present catalyst can be produced, such as by impregnating the base material in a slurry coating solution containing catalyst components, oxygen storage/release materials, and carriers and the like, adsorbing the coating solution onto the surface of the base material, and then drying and firing it, repeatedly. However, it is not limited to such a method. For example, the catalyst may be produced by previously carrying the catalyst components onto the carrier, and then coating a slurry containing them on the base material.

The present invention will now be explained in greater detail by the following examples. However, it is to be understood that the invention is not limited to these examples.

EXAMPLES

Example 1

A palladium nitrate solution (containing about 0.5 g of palladium) was combined with 40 g of alumina, 52 g of ceria with surface area of 25 m$^2$/g, and 60 g of alumina sol (10 wt %) to prepare slurry 1. Separately, slurry 2 was prepared by combining a solution made by dissolving platinum in nitric acid (hereinafter referred to as "platinum nitrate solution": containing about 0.5 g of platinum), 60 g of alumina, and 40 g of alumina sol (10 wt %).

A monolith honeycomb type of base material (volume of 1 L) was coated with slurry 1, dried at 150° C. for one hour, and fired at 500° C. for one hour to prepare a lower layer. The catalyst according to the present invention (the catalyst of Example 1) was prepared by top coating the lower layer with slurry 2, drying it at 150° C. for one hour, and then firing it at 500° C. for one hour. The composition of the catalyst of Example 1 was as follows:

The upper layer: platinum, 0.5 g/L, rhodium, 0.2 g/L, alumina, 64 g/L;

The lower layer: palladium, 0.5 g/L, alumina, 46 g/L, ceria 52 g/L.

Example 2

A platinum nitrate solution (containing about 0.2 g of platinum) was combined with 40 g of alumina, 52 g of ceria with surface area of 25 m$^2$/g, and 60 g of alumina sol (10 wt %) to prepare slurry 3. Separately, slurry 4 was prepared by combining a platinum nitrate solution (containing about 0.8 g of platinum), a rhodium nitrate solution (containing about 0.2 g of rhodium), 60 g of alumina, and 40 g of alumina sol (10 wt %).

The catalyst of the present invention (the catalyst of Example 2) was prepared by using slurry 3 for the lower layer and slurry 4 for the upper layer according to the procedure of Example 1. The composition of the catalyst of Example 2 was as follows:

The upper layer: platinum, 0.8 g/L, rhodium, 0.2 g/L, alumina, 64 g/L;

The lower layer: platinum, 0.2 g/L, alumina, 46 g/L, ceria 52 g/L.

Example 3

A platinum nitrate solution (containing about 0.2 g of platinum) was combined with 50 g of alumina, 52 g of ceria with surface area of 25 m$^2$/g, 8.4 g of neodymium oxide, and 50 g of alumina sol (10 wt %) to prepare slurry 5. Separately, slurry 6 was prepared by combining a platinum nitrate solution (containing about 0.8 g of platinum), a rhodium nitrate solution (containing about 0.2 g of rhodium), 50 g of alumina, 37 g of zirconium oxide and 50 g of alumina sol (10 wt %).

The catalyst of the present invention (the catalyst of Example 3) was prepared by using slurry 5 for the lower layer and slurry 6 for the upper layer according to the procedure of Examples 1 and 2. The composition of the catalyst of Example 3 was as follows:

The upper layer: platinum, 0.8 g/L, rhodium, 0.2 g/L, alumina, 55 g/L, zirconia, 37 g/L;

The lower layer: platinum, 0.2 g/L, alumina, 55 g/L, ceria 52 g/L, neodymium oxide, 8.4 g/L.

Example 4

A platinum nitrate solution (containing about 0.2 g of platinum) was combined with 60 g of alumina, 47 g of ceria with surface area of 25 m$^2$/g, and 60 g of alumina sol (10 wt %) to prepare slurry 7. Separately, slurry 8 was prepared by combining a platinum nitrate solution (containing about 0.8 g of platinum), a rhodium nitrate solution (containing about 0.2 g of rhodium), 40 g of alumina, 42 g of cerium oxide ($CeO_2$)-stabilized zirconium powder (12 wt %) and 40 g of alumina sol (10 wt %).

The catalyst of the present invention (the catalyst of Example 4) was prepared by using slurry 7 for the lower layer and slurry 8 for the upper layer according to the procedure of Examples 1-3. The composition of the catalyst of Example 4 was as follows:

The upper layer: platinum, 0.8 g/L, rhodium, 0.2 g/L, alumina, 44 g/L, cerium oxide-stabilized zirconia, 42 g/L (0.3 mole of zirconium/L, 0.03 mole of cerium/L);

The lower layer: platinum, 0.2 g/L, alumina, 66 g/L, ceria 47 g/L.

Example 5

A rhodium nitrate solution (containing about 0.1 g of rhodium) was combined with 40 g of alumina, 52 g of ceria with surface area of 25 m$^2$/g, and 60 g of alumina sol (10 wt %) to prepare slurry 9.

The catalyst of the present invention (the catalyst of Example 5) was prepared by using slurry 9 for the lower layer and slurry 2 used in Example 1 for the upper layer according to the procedure of Examples 1-4. The composition of the catalyst of Example 5 was as follows:

The upper layer: platinum, 0.5 g/L, rhodium, 0.2 g/L, alumina, 64 g/L;

The lower layer: rhodium, 0.1 g/L, alumina, 46 g/L, ceria 52 g/L.

Comparative Example 1

A platinum nitrate solution (containing about 1 g of platinum) was combined with a rhodium nitrate solution (containing about 0.2 g of rhodium), 100 g of alumina, 52 g of ceria with surface area of 100 m$^2$/g, and 100 g of alumina sol (10 wt %) to prepare slurry 10.

A monolith honeycomb type of base material (volume of 1 L) was coated with slurry 10, dried at 150° C. for one hour, and fired at 500° C. for one hour to prepare a catalyst with a one-layered catalyst coating layer (the catalyst of Comparative Example 1). The composition of the catalyst of Comparative Example 1 was as follows:

Platinum, 1 g/L, rhodium, 0.2 g/L, alumina, 100 g/L, ceria 52 g/L.

Comparative Example 2

A platinum nitrate solution (containing about 1 g of platinum) was combined with a rhodium nitrate solution (containing about 0.2 g of rhodium), 100 g of alumina, 52 g of ceria with surface area of 100 m$^2$/g, 7.5 g of oxidized nickel, and 100 g of alumina sol (10 wt %) to prepare slurry 11.

A monolith honeycomb type of base material (volume of 1 L) was coated with slurry 11, dried at 150 ° C. for one hour, and fired at 500 ° C. for one hour to prepare a catalyst with a one-layered coating layer which contains oxidized nickel (the catalyst of Comparative Example 2). The composition of the catalyst of Comparative Example 2 was as follows:

Platinum, 1 g/L, rhodium, 0.2 g/L, alumina, 100 g/L, ceria 52 g/L, oxidized nickel, 7.5 g/L.

Comparative Example 3

Slurry 12 was prepared by carrying a platinum nitrate solution which contains about 0.6 g of platinum onto 60 g of alumina, and adding thereto 47 g of ceria with surface area of 100 m$^2$/g, 7.5 g of oxidized nickel, and 60 g of alumina sol (10 wt %).

Slurry 13 was prepared by carrying a platinum nitrate solution containing about 0.4 g of platinum and a rhodium nitrate solution which contains about 0.2 g of rhodium onto 40 g of alumina and 42 g of cerium oxide ($CeO_2$)-stabilized zirconium powder (12 wt %), respectively, and combining it with 40 g of alumina sol (10 wt %).

A catalyst with a two-layered coating layer which contains oxidized nickel (the catalyst of Comparative Example 3) was prepared by using slurry 12 for the lower layer and slurry 13 for the upper layer according to the procedure of Examples 1-3. The composition of the catalyst of Comparative Example 3 was as follows:

The upper layer: platinum, 0.4 g/L, rhodium, 0.2 g/L, alumina, 44 g/L, cerium oxide-stabilized zirconia, 42 g/L (0.3 mole of zirconium/L, 0.03 mole of cerium/L);

The lower layer: platinum, 0.6 g/L, alumina, 66 g/L, ceria 47 g/L, oxidized nickel, 7.5 g/L.

1. Measurement of $H_2S$ Emission

A vehicle with 1.5-liter, inline-four engine having the above-mentioned catalyst was used to adsorb sulfur onto the catalyst by running the vehicle at 40 km/hour. Then, the vehicle was accelerated at WOT (wide open throttle), and the emission of $H_2S$ was measured at where the vehicle reached 100 km/hour. The result is shown in FIG. 2.

Figure 2:
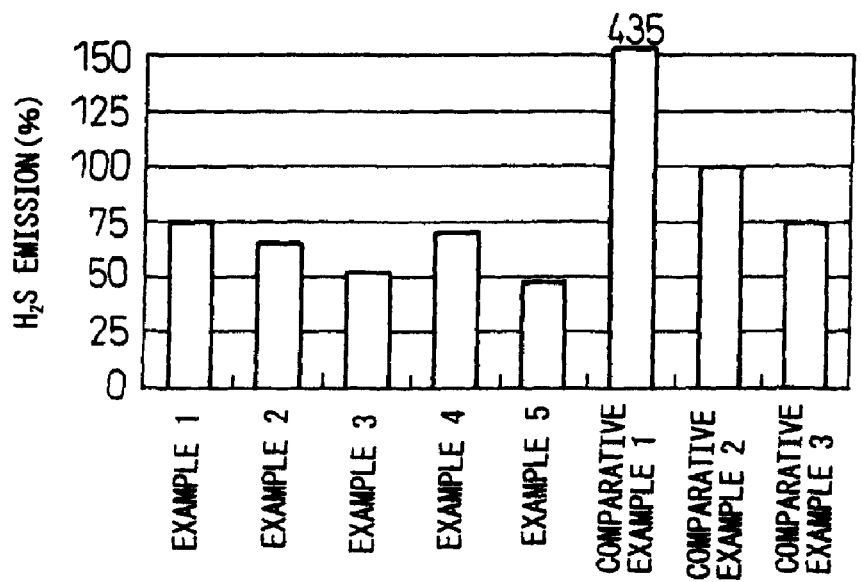
FIG. 2 is a graph showing emissions (%) of $H_2S$ when using the catalysts of Examples 1-5 and Comparative Examples 1-3. In the graph, $H_2S$ emission (%) is represented based on the value of Comparative Example 2 being taken as 100%.

As shown in FIG. 2, the emission of $H_2S$ was significantly reduced when the catalysts of Examples 1-3 were used as compared with the catalyst with the one-layered coating layer which does not contain nickel (Comparative Example 1). They also show reduced emission of $H_2S$ by about 25 to 50% of the catalyst with the one-layered coating layer which contains nickel (Comparative Example 2). The emission of $H_2S$ when using catalysts of Examples 1-5 was reduced to the same level or less even as compared with the catalyst with the two-layered catalysts coating layer which contains nickel (Comparative Example 2). Among these catalysts, the catalysts of Examples 3 and 5 have in particular reduced emission of $H_2S$, wherein neodymium oxide was added into the catalyst of Example 3 as a promoter, and wherein rhodium was contained in the lower layer of the catalyst of Example 5.

2. Measurement of Purification Performances

After the above catalysts were subjected to endurance on 4 L engine for 5 hours at an inlet gas temperature of 800° C., these catalyst were mounted on an actual vehicle having 2.2 L engine. The vehicle was driven setting its operating mode to the LA#4 mode to measure the effect of the catalyst on emissions of NOx, HC and CO. The result of NOx emission is shown in Table 1 and FIG. 3.

TABLE 1

|  | $H_2S$ emission (%) when Comparative Example 1 is taken as 100% | NOx emission |
| --- | --- | --- |
| Example 1 | 17% | 0.081 g/mile |
| Example 2 | 15 | 0.071 |
| Example 3 | 12 | 0.067 |
| Comparative Example 1 | 100 | 0.085 |
| Comparative Example 2 | 23 | 0.088 |
| Comparative Example 3 | 17 | 0.079 |

Figure 3:
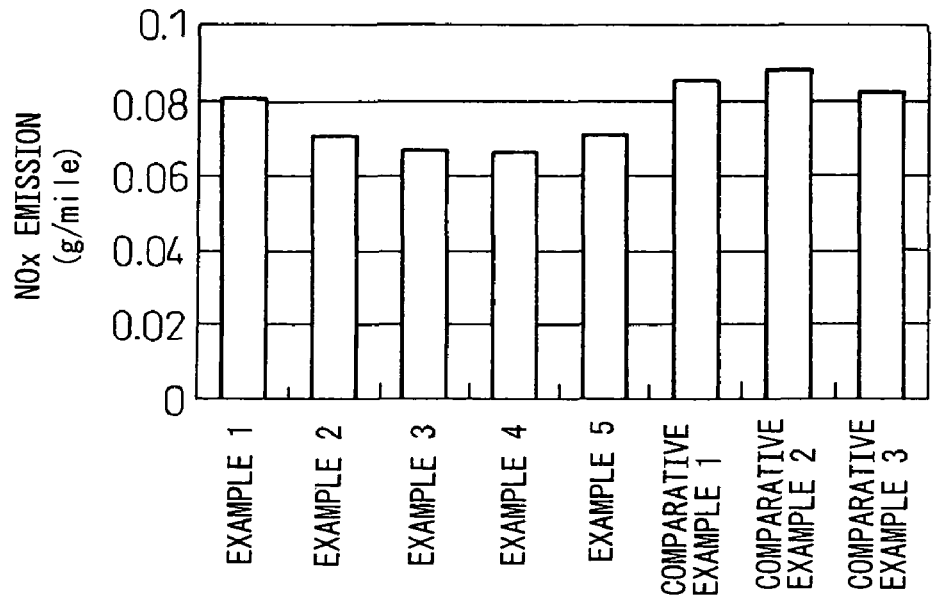
FIG. 3 shows NOx emissions (g/mile) when using the catalysts of Examples 1-5 and Comparative Examples 1-3.

As shown in Table 1 and FIG. 3, use of the catalysts of Examples 1-5 led to reduction of NOx emission to the same level or less as compared with the catalyst with a one-layered catalyst coating layer which does not contain nickel (Comparative Example 1) and the catalyst with a one- or two-layered catalyst coating layer which contains nickel (Comparative Examples 2 and 3). Among them, the catalysts of Examples 3 and 4 showed the lowest NOx emission. Also, the catalyst of Examples 1-5 did not show deterioration in the HC and CO emissions as compared with the Comparative Examples although these results were not shown here.

3. Study of Specific Surface Area of Oxygen Storage/Release Material

Figure 4:
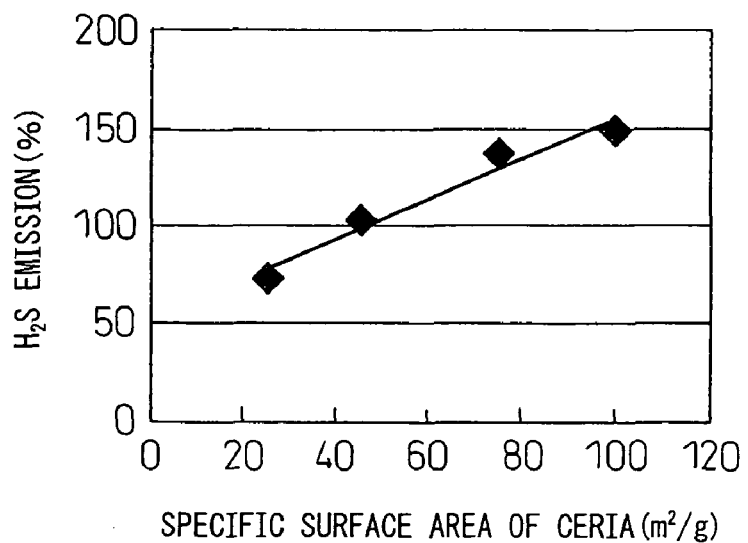
FIG. 4 is a graph plotting a specific surface area ($m^2/g$) of ceria used in the catalyst of Example 1 versus $H_2S$ emission (%). In the graph, $H_2S$ emission (%) is represented based on the value of Comparative Example 2 being taken as 100%.

Then, the relationship was studied between the specific surface area of the oxygen storage/release material used for the catalyst coating layer and the $H_2S$ emission. First of all, several cerias having a specific surface area of 100 m$^2$/g were fired in an electric furnace for 5 hours at varying temperatures to reduce the specific surface areas to 75, 45 and 25 m$^2$/g. These cerias having such specific surface area were used to prepare catalysts with a two-layered catalyst coating layer, which have the same composition of the catalyst components as the one of Example 1. As a result of measuring $H_2S$ purification performances of these catalysts having different specific surface areas as described above, the more the specific surface area of ceria was reduced, the $H_2S$ emission was reduced. Furthermore, as compared with the catalyst of Comparative Example 2, i.e., the conventional catalyst with the one-layered catalyst coating layer which contains nickel, the catalyst having the specific surface area of 45 m$^2$/g showed a comparable $H_2S$ purification performance, and the catalyst having the specific surface area of 25 m$^2$/g (Example 1) showed more excellent $H_2S$ purification performance. These results are shown in Table 2 and FIG. 4.

TABLE 2

| Specific surface area of ceria | $H_2S$ emission (%) when Comparative Example 2 is taken as 100% |
| --- | --- |
| 25 m$^2$/g | 73% |
| 45 | 102 |
| 75 | 137 |
| 100 | 149 |

These results showed that the catalyst according to the present invention, even without nickel being an environmental load substance, has more excellent $H_2S$ purification performance as compared with conventional catalysts while maintaining the purification performance against NOx and the other exhaust gas components.

What is claimed is:

1. An exhaust gas purification catalyst comprising a base material, and a multi-layered catalyst coating layer formed on the base material, wherein the catalyst coating layer consists of an upper layer formed over a surface of a lower layer and the lower layer formed over a surface of the base material, and optionally, a plurality of additional layers in between the upper layer and the lower layer, and wherein the upper layer contains a greater amount of noble metal per liter of the base material than that of the lower layer, wherein the lower layer contains a greater amount of an oxygen storage/release material per liter of the base material than that of the upper layer, and wherein the oxygen storage/release material in the catalyst coating layer has a specific surface area of 30 $m^2/g$ or less.

2. The exhaust gas purification catalyst according to claim 1, wherein the upper layer contains a noble metal selected from the group consisting of platinum, rhodium and mixtures thereof, and wherein the lower layer contains a noble metal selected from the group consisting of palladium, rhodium, platinum and mixtures thereof.

3. The exhaust gas purification catalyst according to claim 1, wherein platinum is contained in the lower layer in an amount of 0.3 g or less per liter of the base material.

4. The exhaust gas purification catalyst according to claim 1, wherein the lower layer contains ceria as the oxygen storage/release material.

5. The exhaust gas purification catalyst according to claim 4, wherein the upper layer contains ceria as the oxygen storage/release material, and wherein the upper layer contains 0.08 mole or less of ceria per liter of the base material.

6. The exhaust gas purification catalyst according to claim 1, wherein the upper and/or lower catalyst coating layer contains neodymium.

7. An exhaust gas purification catalyst comprising a base material, and a multi-layered catalyst coating layer formed on the base material, wherein the catalyst coating layer consists of an upper layer formed over a surface of a lower layer and the lower layer formed over a surface of the base material, and optionally, a plurality of additional layers in between the upper layer and the lower layer, and wherein the upper layer contains a greater amount of noble metal per liter of the base material than that of the lower layer, wherein the lower layer contains an amount of an oxygen storage/release material per liter of the base material, wherein the upper catalyst coating layer does not contain the oxygen storage/release material, and wherein the oxygen storage/release material in the catalyst coating layer has a specific surface area of 30 $m^2/g$ or less.

* * * * *